Feb. 1, 1966 L. MASTENBROOK 3,232,567
METHOD AND APPARATUS FOR MOUNTING A CHRISTMAS TREE
Filed Feb. 20, 1964
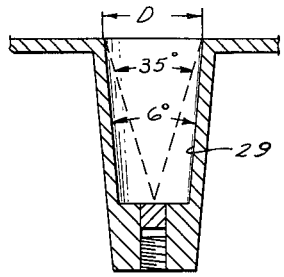
Fig. 4
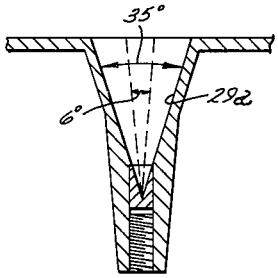
Fig. 5
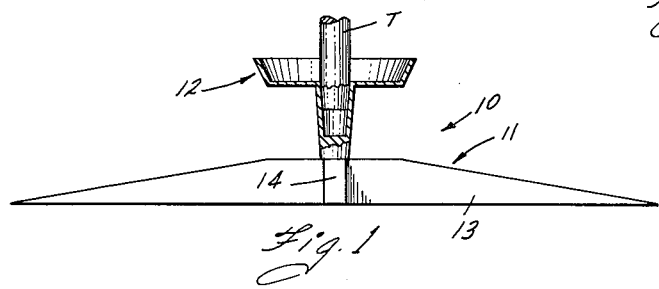
Fig. 1
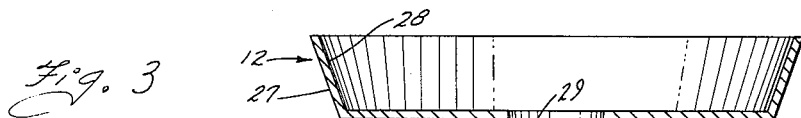
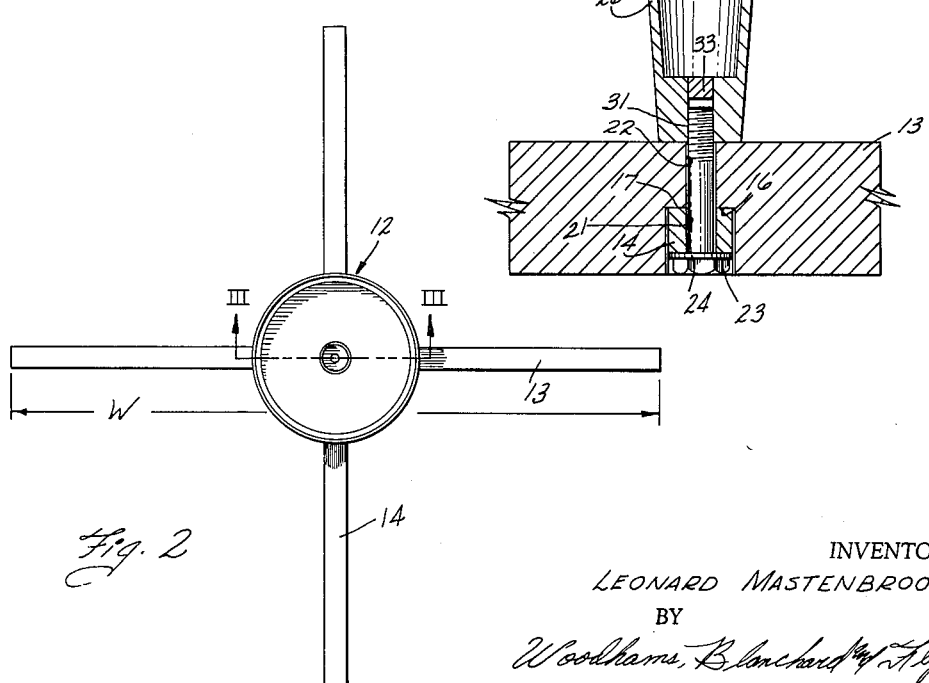
Fig. 3
Fig. 2
INVENTOR.
LEONARD MASTENBROOK
BY
Woodhams, Blanchard & Flynn
ATTORNEYS

United States Patent Office 3,232,567
Patented Feb. 1, 1966

3,232,567
METHOD AND APPARATUS FOR MOUNTING
A CHRISTMAS TREE
Leonard Mastenbrook, 1315 Holland Ave.,
Kalamazoo, Mich.
Filed Feb. 20, 1964, Ser. No. 346,157
1 Claim. (Cl. 248—44)

This invention relates to a method and apparatus for supporting a Christmas tree.

The problems involved in supporting a Chirstmas tree in homes and elsewhere are well known and a great number of different types of tree support stands have been offered to solve same. However, such stands have either been expensive, complex and/or relatively difficult to use or they have not, by themselves, been capable of reliably supporting the Christmas tree in an upright position. Many of such stands are so constructed that they can be used only with trees within a limited size range. Moreover, the prior art stands have not been well adapted for supporting a Christmas tree having a badly misshapen trunk. Accordingly, there still exists a need for a simple and inexpensive, but reliable, tree support stand which is capable of stably supporting a tree in an upright position.

Accordingly, it is an object of this invention to provide an improved Christmas tree support stand, and a method of utilizing same, in which the Christmas tree stand has a socket in the form of a portion of a cone and the butt of a Christmas tree trunk is shaped in the form of a portion of a cone and the tree trunk is inserted into the conical socket and is firmly supported by the side wall thereof.

It is a further object of this invention to provide an improved Christmas tree support stand, as aforesaid, which is of simple, inexpensive and rugged construction and which will effectively hold a tree in an upright position without requiring the use of auxiliary supports, such as guy wires or the like.

Other objects and advantages of the invention will become apparent to persons acquainted with devices of this type upon reading the following disclosure and inspecting the accompanying drawings.

In the drawings:

FIGURE 1 is a partially broken elevational view of the tree support stand embodying the invention and showing the butt end of a Christmas tree inserted thereinto.

FIGURE 2 is a top view of the Christmas tree support stand.

FIGURE 3 is an enlarged fragmentary sectional view taken on the line III—III of FIGURE 2.

FIGURE 4 is a fragment of FIGURE 3 and discloses a preferred embodiment of the invention having a frustro-conical socket.

FIGURE 5 is a view similar to FIGURE 4 and showing a modification in which the socket is a true cone.

Referring to the drawings, the invention provides a Christmas tree stand 10 generally comprising a base 11 and a tree receiving member 12.

The base 11 includes a pair of leg elements 13 and 14 (FIGURES 1 and 2) which are preferably of equal length, which preferably lie at right angles to each other and which cross each other preferably adjacent the middle of each thereof. The leg elements 13 and 14 are notched as indicated at 16 and 17 (FIGURE 3), respectively, where they cross each other for allowing a nesting relationship therebetween whereby the bottom surfaces of the leg elements 13 and 14 define a common plane. The notches 16 and 17 assist in preventing axial displacement of the leg elements 13 and 14 with respect to each other and about the common center thereof in an understood manner whereby the outward ends of each of said leg elements are well spaced from the outward ends of the other leg element thus providing a widely and uniformly supported base. Adjacent portions of the leg elements 13 and 14 have, respectively, a countersunk hole 21 and coaxial hole 22 therethrough for receiving means fastening said leg elements together and to the tree receiving member 12. In this particular embodiment of the invention, such means comprise a bolt 23 which may be equipped with a washer 24 and which extends from the countersunk hole 21 through the coaxial hole 22 and upwardly from the leg element 13. The head of the bolt 23 is received within the countersunk portion of the hole 21.

The tree receiving member 12 comprises a frustro-conical stem portion 26 supporting at its upper end, and preferably integral with, a radially enlarged reservoir portion 27. The reservoir portion 27 has an upwardly opening, here frustro-conical, recess 28 which communicates with a socket 29 in the stem portion 26. The lower end of the stem portion 26 has a downwardly opening threaded hole 31 for threaded engagement of the upper end of the bolt 23 hereinabove discussed. In the particular embodiment shown, the hole 31 extends upwardly into communication with the socket 29 and a plug 33 is inserted in the upper part of the hole 31 to seal the bottom of the socket 29.

When the Christmas tree stand 10 is correctly assembled, the bolt 23 will hold the leg elements 13 and 14 and the tree receiving member 12 sufficiently tight together that no angular or translational motion may take place therebetween. Further, the axis of the socket 29 will be perpendicular to the plane defined by the lower surface of the leg elements 13 and 14 of the base 11 and thus when the Christmas tree stand is placed on a horizontal surface the axis of said socket 29 will be vertical.

It is a critical feature of the invention that the taper of the side wall of socket 29 be such that the socket at the apex defines an included angle of between about 6 degrees and about 35 degrees. Otherwise stated, the angle of the side wall of the socket 29 with respect to the axis of said socket must be between about 3 degrees and and about 17½ degrees. If the included angle is less than 6 degrees, a corresponding tapered tree trunk placed into the socket may seize therein so that it can be pulled out only with great difficulty. If the included angle is greater than about 35 degrees, the tree trunk will not be held sufficiently firmly and it will be capable of wobbling or tipping sidewardly. However, if the included angle is between about 6 degrees and about 35 degrees, the tree will be firmly held in an upright position by only the tree stand 10 and it will not be necessary under ordinary circumstances to use any auxiliary support, such as guy wires or the like.

The diameter D of the base of the conical socket 29 should be relatively small by comparison with the width W of the base 11 so that the base will provide a stable footing for the Christmas tree. In general, the diameter of the base 11 should be at least three times the maximum diameter of the conical socket 29. For Christmas trees of less than about fifteen feet in height, with which the tree stand 10 of the invention is primarily intended to be used, it will ordinarily suffice to make the maximum diameter of the conical socket 29 about two and one-half inches.

FIGURE 5 shows a modification in which the socket 29a is conical in shape but is otherwise identical to the socket 29. This construction is more useable with a large size range of trees than the socket 18 but the depth of the socket is normally greater which may be a disadvantage, particularly where larger trees are involved.

The butt end of the tree trunk T is shaped to form a conical or frustro-conical point P which has a taper corresponding substantially to the taper of the socket 29 or 29a. If desired, the taper of the point P can be made slightly less than the taper of the socket 29 or 29a in order to provide ease of insertion. However, it should not be made too much less than the taper of the conical socket or else looseness in the fit of the point P in the socket will result. Ordinarily, the shaping of the point P will be performed by the grower or seller thereof, desirably by the grower when the tree is cut. The point P should be formed so that the axis thereof extends substantially lengthwise of the trunk of the tree. It will be noted that forming the conical point P in a uniform fashion will overcome the problems heretofore encountered in supporting trees having misshapen tree trunks. A suitable sharpening device, of which many are known, one such being disclosed in Patent No. 1,806,656, may be used for forming the point P.

In the claims, the term "conical" used with reference to the socket and the point of the tree trunk, shall include both conical and frusto-conical constructions.

In use, the stand 10 is placed at the point of use and the pointed end P of the tree is then inserted into the socket 29 or 29a. Ordinarily, some vertical pressure is applied in order to achieve proper seating of the point P in the socket 29 or 29a. Water can then be placed in the recess 28 for the usual purposes.

The tree stand 10 in the particular embodiment shown has the base 11 constructed of wood and the tree receiving member 12 constructed of metal. However, the tree stand 10 may be all metal or may be made of other suitable material as desired. For example, should a tree stand 10 of reduced size be desired for small Christmas trees, such as those of less than 3 feet in height, construction of the tree stand of plastic is contemplated. Further, if the tree stand 10 is formed of a permeable material, an impermeable lining can be placed on the wall of the recess 28 and socket 29 or 29a to prevent leakage of water therefrom.

The tree stand 10 is constructed for ready disassembly as for storage or shipping by merely removing the bolt 23 whereupon the tree receiving member 12 may be removed and the leg elements 13 and 14 may be unnested.

As stated above, the taper of the point P of a tree trunk should be substantially identical to the taper of the socket 29 and 29a in the tree stand 10. Consequently, the seller of Christmas trees must be sure that the purchaser has the proper type of tree stand for the tree being sold, and for this reason may wish to sell the two items together. Indeed, since the tree stand, according to the invention, can be manufactured at low cost, the seller may wish to include same along with the Christmas tree for the purchase price of the Christmas tree alone.

While a particular preferred embodiment of the invention has been described above, the invention contemplates such changes and modifications therein as lie within the scope of the appended claim.

What is claimed is:

A Christmas tree stand comprising:

a base including a crossed, perpendicular pair of elongated leg elements, said leg elements crossing each other adjacent the center of each thereof and being correspondingly notched thereat for nested, interengagement whereby said leg elements provide a radially extended flat bottom surface for said base and a parallel flat upper surface where said leg elements cross each other;

a tree receiving member comprising an elongated stem portion having a flat bottom surface resting on said flat upper surface and extending upwardly therefrom and surmounted by an integral, coaxial, reservoir portion, said reservoir portion being larger in diameter than said stem portion and including an upwardly opening concentric recess defining a compartment into which water can be placed;

said stem portion having a centrally located, inverted, conical socket extending downwardly from the bottom wall of said recess, the axis of said socket extending perpendicularly to said flat upper and bottom surfaces and the bottom said socket being spaced from said upper surface a predetermined distance, the diameter of the base of said socket being relatively small in comparison to the length of said leg elements, the base of said socket opening upwardly through the bottom wall of said recess, the side wall of said socket defining an included angle of between 6 degrees and 35 degrees so that a Christmas tree whose trunk has a conical point of corresponding taper can be disposed within said socket and will be stably supported by said base;

a countersunk hole in the bottom surface of said base, said hole extending upwardly through the crossed portions of said leg elements and opening through the top thereof, said stem portion including a downwardly opening, threaded opening below said socket and isolated therefrom;

screw means insertable into said hole for threadably engaging said threaded opening for firmly holding said leg elements and tree receiving member together in a rigid relationship, removal of said screw means allowing removal of said tree receiving means and separation of said leg elements.

References Cited by the Examiner

UNITED STATES PATENTS

| | | | |
|---|---|---|---|
| 1,043,387 | 11/1912 | Astruck | 248—188.1 |
| 1,401,330 | 12/1921 | Foote | 248—188.7 |
| 1,877,098 | 9/1932 | Washburn | 248—188.1 |
| 2,448,304 | 8/1948 | Gabel | 248—48 |
| 2,617,617 | 11/1952 | Krastel | 248—44 |
| 2,978,780 | 4/1961 | Clarkson | 248—44 X |

CLAUDE A. LE ROY, *Primary Examiner.*

CHANCELLOR E. HARRIS, *Examiner.*

K. J. WINGERT, *Assistant Examiner.*